(12) United States Patent
Cormack et al.

(10) Patent No.: US 8,788,367 B2
(45) Date of Patent: Jul. 22, 2014

(54) TRIP QUOTE SYSTEM AND METHOD

(75) Inventors: Roberto Nicolas Cormack, Cypress, TX (US); John Legh-Page, Houston, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 586 days.

(21) Appl. No.: 12/579,015

(22) Filed: Oct. 14, 2009

(65) Prior Publication Data

US 2011/0087561 A1  Apr. 14, 2011

(51) Int. Cl.
 *G06Q 30/00* (2012.01)
 *G06Q 30/06* (2012.01)
 *G06Q 30/02* (2012.01)
 *G06Q 10/02* (2012.01)

(52) U.S. Cl.
 CPC ........ *G06Q 30/0627* (2013.01); *G06Q 30/0641* (2013.01); *G06Q 10/02* (2013.01); *G06Q 30/0283* (2013.01)
 USPC ............................ 705/26.63; 705/5; 705/27.1

(58) Field of Classification Search
 CPC .......... G06Q 30/0283; G06Q 30/0627; G06Q 30/0641; G06Q 10/02
 USPC .................................. 705/26.1, 26.63, 5, 27.1
 See application file for complete search history.

(56) References Cited

U.S. PATENT DOCUMENTS

| | | | |
|---|---|---|---|
| 7,546,206 B1 * | 6/2009 | Miller et al. | 701/415 |
| 2004/0225953 A1 * | 11/2004 | Rank et al. | 715/500 |
| 2006/0020496 A1 * | 1/2006 | Azzarello et al. | 705/5 |
| 2007/0027769 A1 * | 2/2007 | Bender | 705/14 |
| 2007/0032941 A1 * | 2/2007 | Allen | 701/123 |
| 2007/0095890 A1 * | 5/2007 | Elefant | 235/378 |
| 2008/0046319 A1 * | 2/2008 | Barry et al. | 705/14 |
| 2008/0243663 A1 * | 10/2008 | Eveland | 705/35 |

* cited by examiner

*Primary Examiner* — Amee A Shah
(74) *Attorney, Agent, or Firm* — Donna P. Suchy; Daniel M. Barbieri

(57) ABSTRACT

A system and method of providing an air travel pricing quote, including estimated fees for third-party air flight services and fuel vendors at each stop along the route of an air travel trip. A traveler is able to quickly and automatically retrieve air travel pricing quotes, thereby bypassing the detailed and time-consuming process of drawing up a flight plan, determining foreign and domestic third-party air flight service vendors across the globe, and arranging third-party air flight services.

21 Claims, 11 Drawing Sheets

```
Estimated Begin Date*
6/16/2009                    📅—202

Select the Aircraft Registration ⌒206   or Type*           ⌒208
[ - Select an Aircraft -        ▼]   [Citation X(3250NM)     ▼]  ←204
Aircraft Estimated Long Range Endurance is 3250 Nautical Miles
True Air Speed is 460 KNTS, leg time includes a 15 minute bias.  ←210
                                                          ,214
FAR Type*   ⊙ Part 91 (Private)  ⎫ 212   Include  ☑ Third Party Fees  ,215
            ○ Part 135 (Charter) ⎭ ←            ☑ Fuel Prices ⁄
                                                 Air Routing Services Customize Trip Route* -Enter the ICAO or IATA (,-and blank spaces are allowed between airports)
KNPN-EGGW-EDDF-LIRA-KHPN                        [Check Route] —218
                         ⌣216
                                                                    ＼200
```

FIG. 2

Some legs may require fuel stops.

302 Estimated Fuel Burn Display ⊙ Gal ○ Ltr ○ Lb ○ Kg ~310

300

| Leg | Departure | Arrival | TD | Distance (NM) | Leg Time (hh:mm) | Estimated Fuel Burn | Fuel Stop Analizer |
|---|---|---|---|---|---|---|---|
| 1 | KHPN | EGGW | ● | 2,967 | 6:42 | 2,024 | ⊘ |
| 2 | EGGW | EDDF | ● | 316 355 | 1:01 | 313 | ⊘ |
| 3 | EDDF | LIRA | ● | 522 | 1:23 | 424 | ⊘ |
| 4 | LIRA | KHPN | ● | 3,702 | 8:18 | 2,507 | Fuel Stop Analyzer |
|  |  | Total | ● | 7,546 | 17:24 | 5,268 |  |

- Actual range will be affected by ATC routing, operating speed, weather, outfitting options and other factors.

Fuel Stop Analyzer - need fuel stop

⊘ - fuel stop check passed n/a - not available

Save    Next

FIG. 3

| Time and Distance Calculator (Great Circle) |

— 400

Enter the ICAO or IATA codes in the below related fields:
(",",";","-" and blank space allowed between airports)

| Enter the ICAO or IATA codes or latitude and longitude in the below related fields: | |
|---|---|
| Select an Aircraft Type: | Citation X ⌄ ~402 |
| ICAO/IATA: | KHPN-EGGW ~404 |

Air Speed (Kts>0): 460 ~406　Path Color: Yellow ⌄ ~408
☐ Enroute Airports (Runway Length>6000 feet)　⦿250(NM) ○500(NM) ○750(NM) ~414
410　Runway Length at least [　] (feet) ~412

[Submit] [Reset]

FIG. 4a

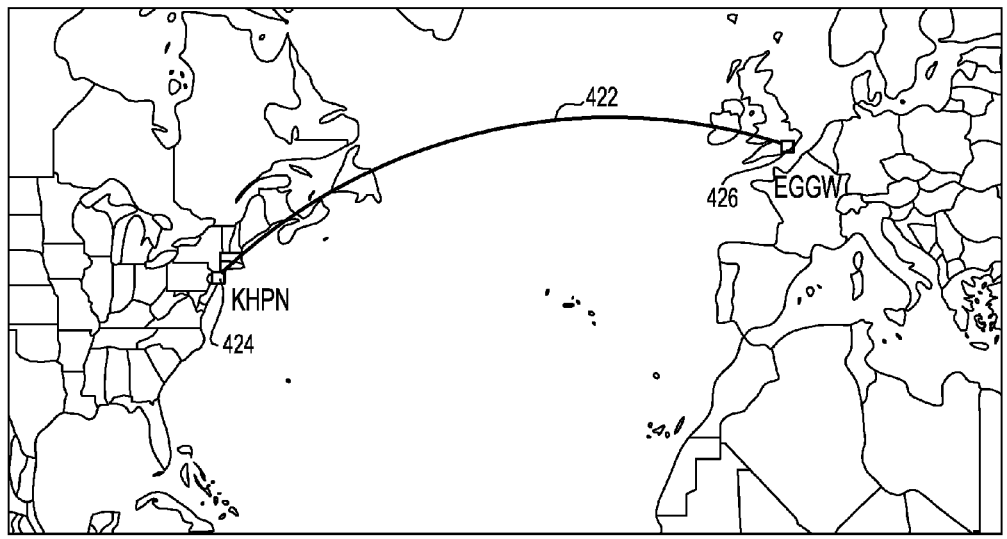

424 — Departure Location
Name: Westchester Co
IATA:HPN
ICAO:KHPN
White Plains, New York United States
Latitude: 41° 4' 1" N
Longitude: 73° 42' 27" W
Elevation: 439 (Feet)
Max Runway Length: 6548 (Feet)
Current UTC Time: 6/16/2009 15:03
Current Local Airport Time: 6/16/2009 11:03
Time Conversion: -4(Hr)
More Information... — 428

426 — Arrival Location
Name: Luton
IATA:LTN
ICAO:EGGW
London, United Kindom
Latitude: 51° 52' 29" N
Longitude: 0° 22' 6" W
Elevation: 526 (Feet)
Max Runway Length: 7086 (Feet)
Current UTC Time: 6/16/2009 15:03
Current Local Airport Time: 6/16/2009 16:03
Time Conversion: +1(Hr)
More Information... — 430

Distance: 2,966.40 (NM) / 3,414.40 (MI) / 5,493.77 (KM) — 432
Trip Time: 6:42 (includes 15 minute bias and air speed at 460Kts) — 434

FIG. 4b

QuoteID #12499

| Leg | Departure | Arrival | RON | FAR Type | Fuel Stop | Distance (NM) | Leg Time (hh:mm) | | Estimated Fuel Burn | |
|---|---|---|---|---|---|---|---|---|---|---|
| 1 | KHPN | EGGW | 1 | ⊙91 ○135 | ☐ | 2967 | 6:42 | | 2024 Gal | |
| ARI Services: ☐ Landing Permit  ☑ Overnight Permit  ☑ Slot | | | | | | | ☑ Weather ☑ Flight Plan ☐ Weather Outlook | | ○ Continental ⊙ InterContinental ☐ TSA Waiver | |
| 2 | EGGW | EDDF | 1 | ⊙91 ○135 | ☐ | 355 | 1:01 | | 313 Gal | |
| ARI Services: ☐ Landing Permit  ☑ Overnight Permit  ☑ Slot | | | | | | | ☑ Weather ☑ Flight Plan ☐ Weather Outlook | | ⊙ Continental ○ InterContinental ☐ TSA Waiver | |
| 3 | EDDF | LIRA | 1 | ⊙91 ○135 | ☐ | 522 | 1:23 | | 424 Gal | |
| ARI Services: ☐ Landing Permit  ☑ Overnight Permit  ☐ Slot | | | | | | | ☑ Weather ☑ Flight Plan ☐ Weather Outlook | | ⊙ Continental ○ InterContinental ☐ TSA Waiver | |

[Back] [Generate Quote]

FIG. 5

Estimated Begin Date: Jul 01, 2009    Aircraft: Citation X
Quote Request Date: Jun 16, 2009     Route: KHPN-EGGW-EDDF-LIRA-CYQX-KHPN
Quote Expiration Date: Jun 26, 2009

| Leg | Departure | Arrival | RON | FAR Type | Fuel Stop | Cost |
|---|---|---|---|---|---|---|
| 1 | KHPN / HPN / Westchester Co / White Plains, United States | EGGW / LTN / Luton / London, United Kingdom | 3 | 91 | No | $ 900 |
|  | Leg Classification: S (Standard - No Permits) |  |  |  | Cost: | No Charge |
|  | Services: ( H / HOT / GT / SLOT / APIS / WXI / FP )  Total Service Level Code: 10 |  |  |  | Cost: | $ 900 |
| 2 | EGGW / LTN / Luton / London, United Kingdom | EDDF / FRA / Frankfurt Main / Frankfurt, Germany | 5 | 135 | No | $ 1,055 |
|  | Leg Classification: P1 (1 Permit Required) |  |  |  | Cost: | $ 245 |
|  | Services: ( H / HOT / GT / SLOT / WXO / WXC / FP )  Total Service Level Code: 9 |  |  |  | Cost: | $ 810 |
| 3 | EDDF / FRA / Frankfurt Main / Frankfurt, Germany | LIRA / CIA / Ciampino / Rome, Italy | 1 | 91 | No | $ 630 |
|  | Leg Classification: S (Standard - No Permits) |  |  |  | Cost: | No Charge |
|  | Services: ( H / HOT / GT / WXC / FP )  Total Service Level Code: 7 |  |  |  | Cost: | $ 630 |
| 4 | LIRA / CIA / Ciampino / Rome, Italy | CYQX / YQX / Gander Int'l / Gander, Canada | 1 | 91 | No | $ 720 |
|  | Leg Classification: S (Standard - No Permits) |  |  |  | Cost: | No Charge |
|  | Services: ( H / HOT / GT / WXI / FP )  Total Service Level Code: 8 |  |  |  | Cost: | $ 720 |

FIG. 6a

| Leg | Arrival | RON | FAR Type | Fuel Stop | Third Party Cost |
|---|---|---|---|---|---|
| 1 | EGGW / LTN / Luton / London, United Kingdom | 3 | 91 | No | $ 8,375 |
| | Ground Handling/Airport/Landing/AirNav/Landing-Approach/Supervision/PermitAssist/BasicCrewTrans/BasicCatering Parking | | | | $ 5,675 $ 2,700 |
| 2 | EDDF / FRA / Frankfurt Main / Frankfurt, Germany | 5 | 135 | No | $ 5,900 |
| | Ground Handling/Airport/Landing/AirNav/Landing-Approach/Supervision/PermitAssist/BasicCrewTrans/BasicCatering Parking | | | | $ 5,400 $ 500 |
| 3 | LIRA / CIA / Ciampino / Rome, Italy | 1 | 91 | No | $ 4,125 |
| | Ground Handling/Airport/Landing/AirNav/Landing-Approach/Supervision/PermitAssist/BasicCrewTrans/BasicCatering Parking | | | | $ 3,875 $ 250 |
| 4 | CYQX / YQX / Gander Int'l / Gander, Canada | 1 | 91 | No | $ 875 |
| | Ground Handling/Airport/Landing/AirNav/Landing-Approach/Supervision/PermitAssist/BasicCrewTrans/BasicCatering Parking | | | | $ 800 $ 75 |
| 5 | KHPN / HPN / Westchester Co / White Plains, United States | 0 | 91 | No | $ 500 |
| | Ground Handling/Airport/Landing/AirNav/Landing-Approach/Supervision/PermitAssist/BasicCrewTrans/BasicCatering | | | | $ 500 |
| | Subtotal all Third Party fees: | | | | $ 19,775 |

Estimated Air Navigation Fees:
(Regional fees not included on specific location estimates)
Overflight Permit Assistance Fees - Total Trip Estimate: No Charge Subtotal - Air Routing Arrangement Fees: $ 2,438
Subtotal - Estimated Third Party Fees: $ 4,025
(Does not include admin fees of 9, 12 or 15 percent) $ 22,213

Grand Total Estimated Trip Charges: $ 26,238
(Does not include admin fees or 9, 12 or 15 percent)
(Fuel Quoted Separately)

FIG. 6b

| Location | Supplier / Into Plane Agent | Gallon Range | Effective Date | Fuel Base US$ Per Gal. | Appr. Taxes/Fees US$ Per Gal. | Total US$ Per Gal. |
|---|---|---|---|---|---|---|
| KHPN / HPN / Westchester Co / White Plains, United States | Avitat Westchester | 1 - 9999 | Jun 09, 2009 | $4.1370 | Included in Fuel Base | $4.1370 |
| | Landmark Aviation | 1 - 500 | Jun 09, 2009 | $4.1476 | Included in Fuel Base | $4.1476 |
| | | 501 - 1500 | Jun 09, 2009 | $4.0395 | Included in Fuel Base | $4.0395 |
| | | 1501 - 9999 | Jun 09, 2009 | $3.9313 | Included in Fuel Base | $3.9313 |
| | Million Air - HPN | 1 - 9999 | Jun 09, 2009 | $3.9830 | Included in Fuel Base | $3.9830 |
| | Panorama Flight Services | 1 - 500 | Jun 09, 2009 | $4.0085 | Included in Fuel Base | $4.0085 |
| | | 501 - 9999 | Jun 09, 2009 | $3.9542 | Included in Fuel Base | $3.9542 |
| | Signature Flight Support | 1 - 500 | Jun 11, 2009 | $4.5261 | Included in Fuel Base | $4.5261 |
| | | 501 - 2000 | Jun 11, 2009 | $3.9855 | Included in Fuel Base | $3.9855 |
| | | 2000 - 99999 | Jun 11, 2009 | $3.8773 | Included in Fuel Base | $3.8773 |
| EGGW / LTN / Luton, United Kingdom | Signature Flight Support | | Jun 01, 2009 | $2.6085 | Domestic $ 0.4292 | $ 3.0377 |
| | Airport Fee - 0.0330 USD/USG (Approx) (All) VAT - TTL * 15% (Domestic) | | | | Intl. 0.0330 | $ 2.6415 |
| EDDF / FRA / Frankfurt Main / Frankfurt, Germany | Exxon Mobil | | Jun 01, 2009 | $2.2789 | $ 4.5897 | $ 6.8686 |
| | Airport Fee - 0.0232 USD/USG (Approx) (All) Infrastructure Fees - 0.0005 USD/USG (Approx) (All) Mineral Oil Tax - 3.4518 USD/USG (Approx) - Part 135 operators can be exempt with proper customs documentation in advance. (All) (135) Storage Fee - 0.0175 USD/USG (Approx ) (All) | | | | Exempt Far (135) $0.4820 | $ 2.7609 |

FIG. 6c

Estimated Fuel Cost (as of Jun 16, 2009):

| Leg | Departure / Arrival | International | FAR Type | Distance (NM) | Leg Time (hr:mm) | Estimated Fuel Burn | Fuel Cost (Departure) | Fuel Cost (Arrival) |
|---|---|---|---|---|---|---|---|---|
| 1 | KHPN - EGGW | International | 91 | 2967 | 6:42 | 2024 Gal | $7,848 | $5,346 |
| 2 | EGGW - EDDF | International | 135 | 355 | 1:01 | 313 Gal | $827 | $864 |
| 3 | EDDF - LIRA | International | 91 | 522 | 1:23 | 424 Gal | $2,912 | $2,276 |
| 4 | LIRA - CYQX | International | 91 | 2770 | 6:16 | 1895 Gal | $10,171 | $4,980 |
| 5 | CYQX - KHPN | International | 91 | 936 | 2:17 | 700 Gal | $1,840 | $2,768 |

FIG. 6d

TRIP QUOTE SYSTEM AND METHOD

BACKGROUND

In the area of private air travel, prior to departure travelers are typically required to create and file a flight plan with the local Civil Aviation Authority (e.g., Federal Aviation Administration in the USA). A flight plan typically includes basic information such as departure and arrival points, estimated time en route, alternate airports in case of bad weather or other circumstances, type of flight (whether instrument flight rules or visual flight rules), the pilot's name, and the number of people on board. For longer flights, the traveler must also be generally familiar with the endurance limits of the aircraft being used, including the aircraft manufacturer specifications regarding preferred flight speeds and the maximum range of the aircraft. Unless the traveler is largely familiar with the limits of the aircraft, a significant amount of research may be required to obtain the needed information so as to ensure a safe trip that does not include unanticipated stops. This research may encompass discussions with individuals having a significant amount of knowledge about the particular aircraft, flight dispatchers, and even aircraft manufacturers.

In the event third-party services related to an air travel flight are required, the traveler would then be compelled to research the various vendors and pricing options along the desired flight path for suitable services. Typical third-party services that can be required during private air travel include acquiring landing and overflight permits, air navigation services, customs services upon reentering the U.S., aircraft fuel services, ground handling arrangements or flight following services, hotel reservations in foreign countries, ground transportation services, catering services, basic air flight crew and air flight crew transportation services, and aircraft parking services. As can be appreciated, researching and arranging for these and other flight-related services can be a detailed and time-consuming process.

Therefore, what is needed is a system that allows a traveler to avoid the time-consuming researching aspects required in private flight planning and instead provide that information in the form of an estimated price quote to the traveler instantly.

SUMMARY

Embodiments of the disclosure may provide a system for automatically providing a trip quote summary report for at least one air travel trip having at least one trip leg. The system may include a user interface configured to allow a user to input a price quote request for an air travel trip including air flight services provided by at least one third-party vendor, a price quoting system communicably coupled to the user interface via a network and configured to receive and process the price quote request, and at least one database communicably coupled to the price quoting system for storing and updating air travel data and air flight service information. They system may also include a data engine communicably coupled to the price quoting system and configured to access the air travel data and air flight service information in the at least one database and process the price quote request into the trip quote summary report, wherein the trip quote summary report includes a summary of third-party fees for the air flight services provided by the at least one third-party vendor and an estimated aircraft fuel pricing for the at least one air travel trip, and a render engine communicably coupled to the price quoting system and configured to convert the trip quote summary report into at least one graphic image viewable on the user interface.

Embodiments of the disclosure may further provide a method of automatically providing a trip quote summary report for at least one air travel trip having at least one trip leg. In at least one embodiment, the method may include entering and submitting a price quote request for air flight services provided by at least one third-party vendor to a price quoting system, wherein the price quote request is entered via a user interface, querying at least one database communicably coupled to the price quoting system to retrieve air travel data and air flight service information corresponding to the price quote request, processing the air travel data and air flight service information to obtain the trip quote summary report, wherein the trip quote summary report includes a summary of third-party fees for the air flight services provided by the at least one third-party vendor and an estimated aircraft fuel pricing for the at least one air travel trip, and displaying the trip quote summary report to the user in at least one graphic image viewable on the user interface.

BRIEF DESCRIPTION OF THE DRAWINGS

The disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIG. 2 illustrates a graphical user interface where a user is able to input various criteria into the system, according to one or more embodiments of the disclosure.

FIG. 3 illustrates a Fuel Burn Display module, according to one or more embodiments of the disclosure.

FIG. 4a illustrates a graphical user interface displaying a time and distance calculator module for at least one trip leg, according to one or more embodiments of the disclosure.

FIG. 4b illustrates a geographical representation of the time and distance calculator as shown in FIG. 4a.

FIG. 5 illustrates a trip leg customization graphical user interface, according to one or more embodiments of the disclosure.

FIG. 6a illustrates a first portion of a trip quote summary report, including fees incurred through the flight operations service provider.

FIG. 6b illustrates a second portion of a trip quote summary report, including projected third-party fees incurred during the planned air travel trip.

FIGS. 6c-6d illustrate a third portion of a trip quote summary report, including providing aircraft fuel pricing from various vendors at locations along the air travel trip.

DETAILED DESCRIPTION

Figure 1:
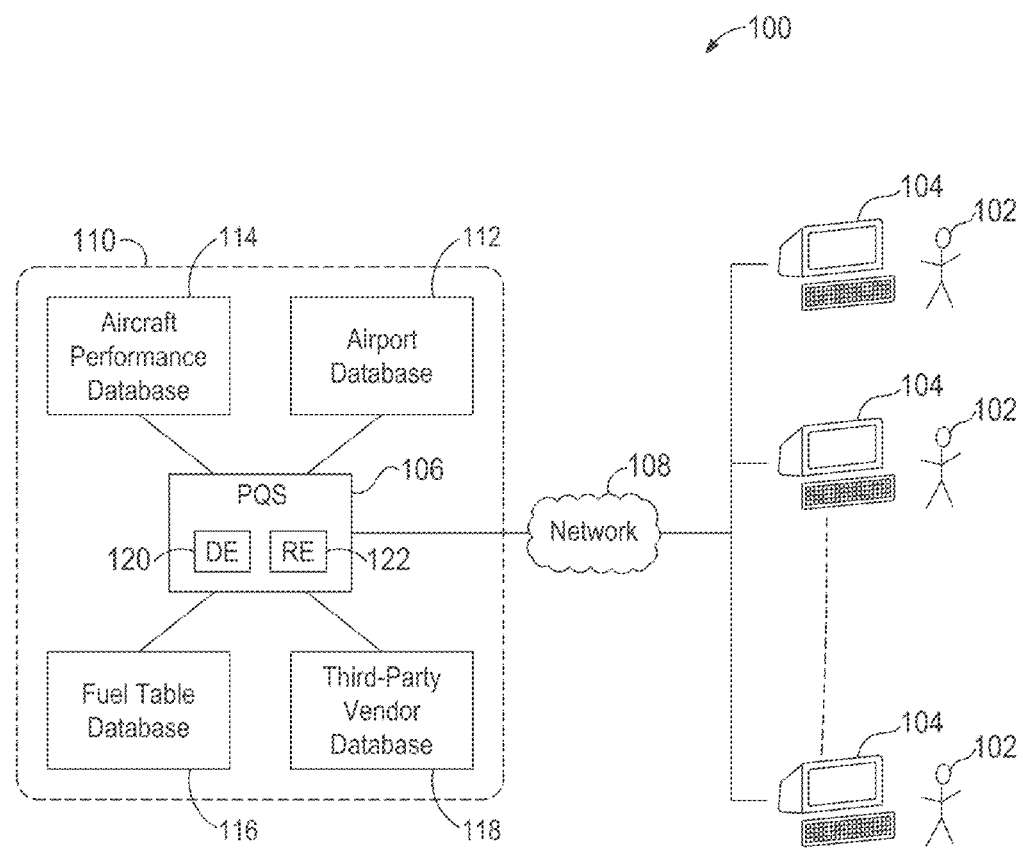
FIG. 1 illustrates a schematic of the trip price quoting system according to one or more embodiments of the disclosure.

It is to be understood that the following disclosure describes several exemplary embodiments for implementing different features, structures, or functions of the invention. Exemplary embodiments of components, arrangements, and configurations are described below to simplify the disclosure, however, these exemplary embodiments are provided merely as examples and are not intended to limit the scope of the invention. Additionally, the disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. In the following discussion and in the claims, the terms "including" and "comprising" are used in an open-ended PQShion, and thus should be interpreted to mean "including, but not limited to." Any and all numerical values in this disclosure may be exact or approximate values unless otherwise specifically stated. Accordingly, various embodiments of the disclosure may deviate from the numbers, values, and ranges disclosed herein without departing from the intended scope.

The disclosure may include a computer system which typically includes hardware capable of executing machine-readable instructions, as well as the software for executing the machine-readable instructions to produce a desired result. Hardware generally includes at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards.

Software includes any machine code stored in any memory medium, such as RAM or ROM, and machine code stored on other devices, such as floppy disks, flash memory, hard drives, network drives, or a CD-ROM. Software may include source or object code, for example. In addition, software encompasses any set of instructions capable of being executed in a client machine or server. Software may include one or more logical units known as modules.

In describing selected embodiments, various objects or components may be implemented as computing modules. These modules may be general-purpose, or they may have dedicated functions such as memory management, program flow, instruction processing, object storage, etc. The modules can be implemented in any way known in the art. For example, in one embodiment a module is implemented in a hardware circuit including custom VLSI circuits or gate arrays, off-the-shelf semiconductors such as logic chips, transistors, or other discrete components, as are known in the art. One or more of the modules may also be implemented in programmable hardware devices such as field programmable gate arrays, programmable array logic, programmable logic devices or the like.

In an exemplary embodiment, one or more of the modules may be implemented in software for execution by various types of processors. An identified module of executable code may, for instance, include one or more physical or logical blocks of computer instructions that may, for instance, be organized as an object, procedure, or function. Further, the executables of an identified module need not be physically located together, but may include disparate instructions stored in different locations that, when joined logically together, include the module and achieve the stated purpose for the module. A "module" of executable code could be a single instruction, or many instructions, and may be distributed over several different code segments, among different programs, and across several memory devices. Similarly, operational data may be identified and illustrated in association with one or more modules, and may be embodied in any suitable form and organized within any suitable type of data structure. The operational data may be collected as a single data set, or may be distributed over different locations including over different storage devices, and may exist, at least partially, as electronic signals on a system or network.

In some embodiments, higher-level components may be used as modules. For example, one module may include an entire computer acting as a network node. Another module may include of an off-the-shelf or custom program, such as a database management system. These higher-level modules may be decomposable into smaller hardware or software modules corresponding to different parts of a software program and identifiable chips (such as memory chips, ASICs, or a CPU) within a computer.

One type of module is a "network." A network module defines a communications path between endpoints and may include an arbitrary amount of intermediate modules. A network module may encompass various pieces of hardware, such as cables, routers, and modems, as well the software necessary to use that hardware. Another network module may encompass system calls or device-specific mechanisms such as shared memory, pipes, or system messaging services. A third network module may use calling conventions within a computing module, such as a computer language or execution environment. Information transmitted using the network module may be carried upon an underlying protocol, such as HTTP, BXXP, or SMTP, or it may define its own transport over TCP/IP, IPX/SPX, Token Ring, ATM, etc. To assure proper transmission, both the underlying protocol as well as the format protocol may split the information into separate pieces, wrap the information in an envelope, or both. Further, a network module may transform the data through the use of one or more computing modules.

Combinations of software and hardware may be used for providing enhanced functionality and performance for certain embodiments of the disclosure. One example is to directly provide price quotes for third-party air flight services for air travel trips involving at least two legs. Accordingly, it should be understood that combinations of hardware and software are also included within the definition of a computer system, and are thus envisioned by the disclosure as possible equivalent structures and equivalent methods.

Data structures are defined organizations of data that may enable an embodiment of the invention. For example, a data structure may include an organization of data, or an organization of executable code. Data signals could be carried across various transmission mediums and store and transmit various data structures, and, thus, may be used to transmit an embodiment of the invention.

At least one embodiment of the disclosure may be designed to work on any specific architecture. For example, the systems disclosed herein may be executable on a single computer, through local area networks, client-server networks, wide area networks, internets, hand-held and other portable and wireless devices and networks. The methods described herein may be implemented using software encoded on a computer-readable medium. Further, methods described herein may also be implemented using hardware configured to carry out the methods.

A database, as described herein, may be any standard or proprietary database software, such as ORACLE, MICROSOFT ACCESS, SYBASE, or DBASE II, for example. The database may have fields, records, data, and other database elements that may be associated through database specific software. Additionally, data may be mapped, or associating one data entry with another data entry. For example, the data contained in the location of a character file can be mapped to a field in a second table. The physical location of the database is not limiting, and the database may be remote or distributed. For example, the database may exist remotely from the server, and run on a separate platform. Further, the database may be accessible across the Internet. It is to be understood that more than one database may be implemented or used to create a single database.

Referring now to FIG. 1, illustrated is a system 100 for automatically providing to at least one user 102 a trip quote for an air travel trip heading to at least one destination around the world. In at least one embodiment, the air travel trip may involve at least two trip legs. The term "leg" refers to a trip segment between any two airports. For example, if an aircraft travels from Houston, Tex. to Rio de Janeiro, Brazil through Panama City, Panama, the entire trip has two legs, which is the one from Houston to Panama City, and the other from Panama City to Rio de Janeiro. As will be seen, however, the disclosure equally contemplates air travel trips constituting a single leg. In either case, the system 100 may be configured to provide the user 102 with air travel pricing information, including third-party fees that may be incurred, along any leg of an air travel trip.

The system 100 may be accessed by one or more users 102 via a user interface 104. The user interface 104 may include, without limitation, a desktop computer, a mobile computing device, or another type of remote terminal or access point. In an exemplary embodiment, the user interface 104 may include a CPU and memory (not shown), and may also include an operating system ("OS") that controls the operation of the user interface 104. The OS may be a MICROSOFT WINDOWS OS, but in other embodiments, the OS may be any kind of operating system, including without limitation any version of the LINUX OS, any version of the UNIX OS, or any other conventional OS as is known in the art.

In an exemplary embodiment, a user 102 may provide the user interface 104 with input using any peripheral adapted to receive input and provide it to the OS, including without limitation, a keyboard, mouse, or touch screen display. In turn, the user interface 104 may provide the user 102 with output using any peripheral adapted to provide output from the OS to the user 102, including without limitation, a printer or a display (e.g., monitor). In at least one embodiment, the display may provide the user 102 with at least one graphical user interface (GUI), enabling the user 102 to interactively communicate with the system 100, as will be described in more detail below.

The user interface 104 may be communicably coupled to a Price Quoting System (PQS) 106 via a network 108. The network 108 may include the Internet; however, the network 108 may be an intranet or combination of any other network known in the art. The PQS 106 may be conveniently housed in a central location, such as an Operational Center (OC) 110 which is maintained by a flight operations service provider. Within the OC 110, the PQS 106 may be communicably coupled to at least one database configured to store and update air travel data. For example, as shown in the illustrated embodiment, the PQS 106 may be communicably coupled to at least an airport database 112, an aircraft performance database 114, a fuel table database 116, and a third-party vendor database 118. Various air travel data may be stored within each database 112, 114, 116, 118, including data such as airport information, aircraft information, aircraft fuel pricing information, and third-party vendor fees for flight services. In alternative embodiments, however, the OC 110 may include other databases configured to fit the particular application. Moreover, in at least one embodiment, the databases 112, 114, 116, 118 may all be combined into a single database.

The airport database 112 may include data related to one or more airports across the world, and may be configured to store that data and update it periodically as needed. In an exemplary embodiment, the airport database 112 may include airport information that can be automatically pulled and processed by the PQS 106. Such information may include airport latitude/longitude data, available runway information, airport contact information, available fuel suppliers and vendors, available airport services, ground handling services, and available maintenance services. As can be appreciated, however, many other types of airport-related data can be stored and provided in the airport database 112 to fit the particular application.

The aircraft performance database 114 may include manufacturer-supplied aircraft information relating to a plurality of different aircraft. The information stored in the aircraft performance database 114 may be automatically pulled and processed by the PQS 106 when requested. In at least one embodiment, the aircraft performance database 114 may store fuel burn information for the various aircraft that may be used in an air travel trip. Fuel burn information is vital in calculating the overall endurance of a specific aircraft over a particular length of an trip leg. For example, depending on the aircraft, the amount of fuel expended for each leg may differ greatly, thus altering the feedback ultimately given to the user 102. The aircraft performance database 114 may include fuel burn values for short-leg air travel trips (trips typically less than or equal to one hour), long-leg air travel trips (trips typically greater than six hours), and medium-leg air travel trips (trips falling between short and long legs).

The fuel table database 116 may include fuel data from aircraft fuel vendors, or fixed base operators ("FBO"), at airports around the world. As is known in the industry, an FRO is a service center at an airport that, at a minimum, offers aircraft fuel. The database 116 may also include and populate the various taxes and fees applicable at each airport in every country and apply them to the FBO fuel pricing.

The fuel pricing, including all applicable taxes and fees, stored in the fuel table database 116 may be continuously updated via various methods. For example, some FBO's may disseminate current fuel pricing on a monthly, bi-monthly, or weekly basis. In some instances the database 116 may receive weekly fuel schedules directly from the FBO, or a computer may be programmed to download weekly fuel pricing information directly from a vendor's website. Alternatively, fuel pricing may be data mined by web-bots searching for duel pricing. For some vendors it may be necessary to directly contact the FBO via electronic mail or via telephonic communication to obtain the current fuel pricing. Such direct contact may be carried out by the flight operations service provider. The fuel table database 116, therefore, may be configured to compile and continuously update the fuel pricing offered by the several FBO's at airports around the world. As is described in more detail below, the user 102 may be given the option to choose between the various FBO's at their respective airports along the air travel trip route based upon the fuel pricing offered.

The third-party vendor database 118 may be configured to store and distribute current pricing details for a variety of air flight services typically provided by third-party vendors. In an exemplary embodiment, the third-party vendor database 118 may contain archived and current pricing details for each air flight service from a plurality of vendors at airports around the world. In processing the price quote request, the PQS 106 may be configured to access the third-party vendor database 118 and retrieve data-mined information for each requested service for the particular location. The pricing information stored in the third-party vendor database 118 may be updated continuously through either direct communication with each vendor, or through computerized updating techniques, such as, programs that automatically download service pricing information directly from a vendor's website at predetermined intervals.

In at least one embodiment, the various third-party air flight services may include acquiring landing permits for the destination airport, acquiring overflight permits, scheduling slots, air navigation services for landing/approach, providing customs services upon reentering the U.S. including reporting Advanced Passenger Information System (APIS) required documentation in either the U.S. or the Caribbean, ground handling arrangements or flight following services, arranging for hotel reservations in foreign or domestic countries, providing ground transportation services, providing localized weather forecasts and forecasting services, catering services, flight supervision services, basic air flight crew and air flight crew transportation services, parking services, and developing and filing a flight plan with the local Civil Aviation Authority (e.g. Federal Aviation Administration in the USA).

In an exemplary embodiment, the PQS 106 may include a software Data Engine (DE) 120 for accessing, compiling, and processing the various data structures stored in the databases 112, 114, 116, 118 and a software Render Engine (RE) 122 responsible for graphic or animation data processing. The RE 122 may be dedicated to processing graphic images such as a geographic representation 420 (FIG. 4b), and several other graphical user interfaces, as described below. In at least one embodiment, the RE 122 may be configured to process or convert the results of the data processing undertaken by the DE 120 into visible graphic images for user 102 reference via the user interface 104. Employing the user interface 104, a user 102 may be able to access the information from the PQS 106 through the network 108 via the user interface 104.

In order to provide a user 102 with a price quote for an air travel trip involving at least two trip legs, the PQS 106 may be configured to collect and process a request from the user 102 through the network 108. By way of linked computer-generated visual displays, commonly identified as pages, windows or screens, which have an integrated graphic user interface (GUI) provided by the RE 122, the user 102 can input and view information processed on the PQS 106. As illustrated in FIGS. 2 through 5, at least a few examples of GUI screens are available for entering and viewing trip and fuel pricing-related information.

With reference to FIG. 2, illustrated is a quote details GUI 200, where a user 102 is able to manually input various pieces of flight information corresponding to an air travel trip, thus beginning the process of ultimately retrieving a price quote summary for the entire trip. As illustrated, the user 102 may begin by inputting an estimated begin date 202 to inform the system 100 of an approximate departure date. The estimated begin date 202 may have an impact on the price quote summary since pricing for third-party services and fuel constantly vary with time.

The quote details GUI 200 may also include an Aircraft Details 204 module, wherein a user 102 may select which aircraft is to be used for the air travel trip. The user 102 has the option to select an aircraft from a known fleet of aircraft 206, for example, fleet aircraft owned and operated by a large corporation. To be able to select from an aircraft listed in the known fleet of aircraft 206 option, the user 102 would have previously stored this information with the PQS 106 (FIG. 1). Thus, upon logging onto the system 100 anew, information corresponding to previously entered fleet aircraft 206 would be automatically refreshed and available to the user 102 to choose.

If the user 102 does not have a known fleet of aircraft to choose from, a generic aircraft may be selected from a listing of generic aircraft 208, provided by the flight operations service provider. In an exemplary embodiment, the generic aircraft listing 208 may be tied to the aircraft performance database 114 (FIG. 1), which may include the various aircraft makes and models available from a range of aircraft manufacturers around the world. As illustrated, the listings of known aircraft 206 and generic aircraft 208 may be embodied in a drop-down menu feature, wherein the drop-down menu may allow the user 102 to search each type of aircraft in a scroll-bar fashion and click on the desired aircraft to be used.

In either case, once a desired aircraft is selected, the PQS 106 may be configured to automatically access the aircraft performance database 114 and retrieve maximum endurance 210 information for the chosen aircraft. The aircraft's maximum endurance 210 corresponds to the maximum distance the selected aircraft is capable of flying without requiring a refueling stop. In most cases, the maximum endurance 210 is provided directly from the manufacturer of the particular aircraft. In the illustrated embodiment, for example, a CESSNA® Citation X aircraft has been selected from the listing of generic aircraft 208. As provided by the manufacturer through the aircraft performance database 114, the maximum endurance 210 of the CESSNA® Citation X is 3,250 nautical miles.

The quote details GUI 200 may also allow the user 102 to filter the resulting price quote corresponding to a particular fuel pricing 212 strategy. In particular, the user 102 may define under Federal Aviation Regulations (FAR) whether the selected flight will be classified as a private flight ("91") or a charter flight ("135"), which can have a substantial impact on taxes and/or fees at various airports around the world. For example, in Germany a user 102 may avoid paying a mineral fee if the flight is a charter flight ("135"), thus potentially saving the user 102 an equivalent of $1.00 per gallon in fuel costs. In other countries, the type of flight may dictate whether the aircraft is wholly exempt from all fuel fees. As can be appreciated, such a fee reduction can potentially save a user 102 a significant amount of money. However, if neither FAR type is selected, the resulting price quote will not include any fee reductions tied to FAR classified aircraft.

Another aspect of the quote details GUI 200 may allow a user 102 to de-select options to search third-party fees 214 or fuel pricing 215. For some users 102, it may not be needed or desired to check third party fees 214 or fuel prices 215 at air travel stops along the air travel route. For example, a user 102 may have already searched these pricings and would therefore not need price quotes for third-party fees or fuel. By default, however, the system 100 may automatically search these options 214,215 so as to return a full price quote.

The quote details GUI 200 may also include a Trip Route module 216, whereby a user 102 can manually input the desired departure and destination airports 204 using industry-known ICAO (International Civil Aviation Organization) codes. In the illustrated embodiment, for example, ICAO codes are entered for KHPN (White Plains, N.Y., United States), EGGW (London, United Kingdom), EDDF (Frankfurt, Germany), LIRA (Rome, Italy), and back to KHPN. In other words, the user 102 plans to execute an air travel trip consisting of four trip legs, including departing from White Plains, making a stop in London, making another stop in Frankfurt, making yet another stop in Rome, and finally returning to White Plains. Instead of manually typing in the ICAO codes, it is also within the scope of the disclosure to employ a pull-down menu whereby the user 102 may choose from a comprehensive listing of ICAO codes to select the desired airport and input them in order.

By clicking on the Check Route 218 button, the system 100 may perform a preliminary verification for each trip leg route entered by the user 102 and provide the user 102 with an Estimated Fuel Burn Display 300 module, as shown in FIG. 3. As part of this process, the PQS 106 may be configured to verify that each airport code entered in the module 216 is correct. If incorrect, the user 102 will be prompted to make appropriate corrections. Furthermore, the system 100 may perform preliminary calculations designed to confirm that the selected aircraft will be able to reach each selected destination, taking into consideration aircraft endurance limits, and alert the user 102 to instances where a refueling stop may be required.

Referring now to FIG. 3, the Estimated Fuel Burn Display 300 module may provide estimated fuel burn information based on the specific aircraft chosen and in conjunction with the desired trip legs 302. For example, the row including the first leg 303 provides data for the trip leg departing from KHPN and arriving at EGGW. The trip leg distance 304 between each airport may be automatically calculated by the DE 120 in the PQS 106 (FIG. 1). This may be accomplished by loading latitude/longitude information for the respective airports from the airport database 112 and determining the global distance (i.e., great circle distance) between the two. In the illustrated embodiment, for example, the calculated leg distance 304 from KHPN to EGGW is 2,967 nautical miles (NM).

The DE 120 may also determine the leg time 306, or the expected flight time between the departure airport to the arrival airport. The leg time 306 may be calculated using the preferred air speed corresponding to the aircraft selected by the user 102. The preferred air speed is a typical air speed where, on average, an aircraft can achieve improved fuel efficiency. However, at the risk of decreasing overall fuel efficiency, a user 102 may be able to manually change the preferred air speed, as will be described below, thereby altering the calculated leg time 306. This may prove advantageous in scenarios where a shorter leg time 306 is needed to meet a particular itinerary. In the illustrated embodiment, the preferred air speed is set at 460 knots, therefore, the leg time 306 to travel from KHPN to EGGW during the first leg 303 would be six hours and forty-two minutes.

The display 300 may further provide the user 102 with an estimated fuel burn 308 for each leg of the trip, which may also be calculated by the DE 120. By clicking on the various display options 310, the user 102 may select to view fuel burn estimates 308 either in gallons (Gal), liters (Ltr), pounds (Lb), or kilograms (Kg). In the illustrated exemplary embodiment, the estimated fuel burn 308 for the first trip leg 303 is about 2,024 gallons.

In the event the trip leg distance 304 for the particular trip leg 302 exceeds the maximum endurance 210 of the selected aircraft 206, 208 (FIG. 2), the user 102 may be prompted by the system 100 to seek an appropriate refueling location by employing a Fuel Stop Analyzer 312 module. The Fuel Stop Analyzer 312 may be configured to aid the user 102 in selecting an appropriate fuel stop airport along the route of the particular trip leg 302. In the illustrated exemplary embodiment, the fourth leg 314 from LIRA (Rome, Italy), to KHPN (White Plains, N.Y.) comprises a trip leg distance 304 of 3,702 NM, while flying a CESSNA® Citation X having a maximum endurance 210 (FIG. 2) of about 3,250 nautical miles. Since the maximum endurance 210 of the aircraft is less than the trip leg distance 304, the user 102 is automatically alerted that a refueling stop will be required between these two stops.

To locate a suitable refueling airport between the departure and arrival airports, the user 102 may click on the Fuel Stop Analyzer 312 button. The Fuel Stop Analyzer 312 module is disclosed in co-pending U.S. application Ser. No. 12/904,843, entitled Fuel Stop Analyzer System and Method, the contents of which are herein incorporated by reference in their entirety. Once an appropriate refueling stop is selected through the Fuel Stop Analyzer 312, the user 102 may be returned to the Display 300 module for further processing of the price quote.

The Estimated Fuel Burn Display 300 may also allow the user 102 to retrieve a Time and Distance Calculator 400 (FIG. 4a) for each trip leg 302. The Time and Distance Calculator 400 may be configured to geographically characterize the selected trip leg 302 and further provide the user 102 with logistical travel information for each airport. To access the Time and Distance Calculator 400, the time and distance icon 316 may be clicked for a particular trip leg 302.

Referring now to FIGS. 4a and 4b, illustrated is the Time and Distance Calculator 400 (FIG. 4a) and a corresponding geographical representation 420 (FIG. 4b). The Calculator 400 GUI may include several fields where filter criteria may be inputted by the user 102 so as to manipulate the corresponding geographical representation 420. Some of the fields in the Calculator 400 may be automatically populated by the system 100 with data corresponding to the specific trip leg 302 selected in the Estimated Fuel Burn Display 300. For example, the aircraft type 402 is automatically populated as the CESSNA® Citation X, directly corresponding to the previously selected aircraft. Moreover, the ICAO/IATA codes 404 are also automatically populated for the selected trip leg 303 (FIG. 3). The preferred air speed 406 may also be automatically populated, but can be manually altered at this point to fit a particular itinerary or travel time.

The geographical representation 420 (FIG. 4b) may include a trip leg route 422, representing the flight path of the selected trip leg 303 (FIG. 3). In at least one embodiment, the user 102 may be able to manipulate the geographical representation 420 via the GUI 400. For example, the GUI 400 may allow the user 102 to alter the path color 408 of the trip leg route 422. Furthermore, by selecting the Enroute Airports module 410, the geographical representation 420 will graphically indicate enroute airports having a specified minimum runway length 412. Since all aircraft do not stop or take off in the same distance, the user 102 may tailor the geographical representation 420 to indicate airports that fit a particular aircraft specification. If a preferred runway length 412 is not entered, the system 100 may be programmed to automatically filter to airports with a minimum runway length of 6,000 feet, or the average stopping distance for private aircraft.

Moreover, by selecting a corridor range 414, the user 102 may choose to graphically display only those airports located within an indicated corridor surrounding the trip leg route 422. Briefly, this option 414 creates a corridor, or tunnel, that places distance limitations on where enroute airports will be graphically displayed on the geographical representation 420. For example, in the illustrated exemplary embodiment, a corridor distance of 250 nautical miles (NM) is selected. This directly corresponds to a distance of 250 NM, parallel offset on both sides of the trip leg route 422, thereby creating a filter corridor of 500 NM wherein potential enroute airports will be searched and displayed, and airports that lie outside of the defined dimensions will be disregarded.

The geographical representation 420 may also include logistical information for the specified departure airport 424 and arrival airport 426 corresponding to the selected trip leg route 422. Such logistical information may be loaded directly from the airport database 112 (FIG. 1) and processed by the PQS 106, as described above. In particular, logistical information for each airport 424, 426 may include the official airport name, the IATA/ICAO codes, geographic location (including latitude/longitude data), available runway information, airport contact information, airport coordinated universal time (UTC) and current time, and the time conversion occurring from departure 424 to arrival 426 airports.

Moreover, the user 102 may be able to access additional information by clicking on the More Information hyperlink 428, 430. Such information may include current weather information, including weather forecasts, and localized fuel pricing information. Also provided on the geographical representation may be the geographic (great circle) distance 432, available for user 102 reference in varying distance references, and the overall trip leg time 434 for the selected leg route 422.

Referring again to FIG. 3, once the user 102 has arranged each trip leg 302 to desired specifications as described above, the prepared itinerary may be saved for future reference by clicking the Save 318 button. Alternatively, the user 102 may proceed to request and customize various third party services for each trip leg 302 by clicking the Next 320 button.

Referring now to FIG. 5, the user 102 may proceed to customize the air flight services and events for each trip leg 302 via the trip leg customization GUI 500. For example, the user 102 may schedule the period of days between trip legs 302 by manually inputting the number of days in the room overnight (RON) column 502, for each leg 302, respectively. As can be appreciated, the number of days the user 102 decides to stay between legs will directly factor into the various several third-party costs, including parking fees and any other fee that is time-sensitive. The FAR type 504 may also be altered for specific legs 302 of the air travel trip. In other words, a user 102 may choose to fly with a different FAR certificate for different legs 302 of the trip, thus changing the required flight permits and potentially saving the user 102 flight costs.

The trip leg customization GUI 500 may also provide a services module 508 for each leg 302. In the services module 508, a user 102 may have the option to pick and choose from several air flight services that may be scheduled to be executed during any of the air travel legs 302. The selection of air flight services available to the user 102 may either be provided directly through the operations service provider or alternatively through third-party vendors. Nevertheless, upon choosing any air flight service, it is the operations service provider that ultimately arranges the execution of the various services.

Once the desired third-party services for each trip leg 302 have been customized and tailored to user 102 specifications, the user 102 may click on the Generate Quote 510 button to process the trip quote. As explained above, it is the PQS 106 (FIG. 1) that may be configured to access and pull all the relevant information from the various databases 112, 114, 116, 118 communicably coupled thereto and process the request into a trip quote summary report for user 102 reference.

Referring now to FIGS. 6a-6d, illustrated are at least three portions of an exemplary trip quote summary report provided by a flight operations service provider through the system 100. Illustrated in FIG. 6a is a first portion of the trip quote summary report which depicts an exemplary flight operations service provider fee summary 602 corresponding to the fees charged by the flight operations service provider to arrange the various third-party services 610 as requested by the user 102. In particular, the fee summary 602 includes per-leg billing information for the various services 610 requested during each trip leg 604, including services performed both at the departure airport 606 and arrival airport 608. Also included in the fee summary 602 may be the fees for required flight permits 612, such as overflight or landing permits that are acquired and processed on behalf of the user 102.

For reference in calculating the fees, the following acronyms may be used to identify the various air flight services 610 as shown in FIG. 6a: a) Ground Handling Arrangements or Flight Following ("H"); b) Hotel Reservations ("HOT"); c) Customs/Immigration/Agriculture Arrangements ("CUST"); d) Ground Transportation Arrangements ("GT"); e) APIS USA Notifications for Commercial and Private ("APIS"); f) Computer Flight Plan & Prefile/Euroslot ("FP"); g) Airport Arrival/Departure Slots ("SLOT"); h) Full Weather Briefing (Continental) ("WXC"); i) Full Weather Briefing (Intercontinental) ("WXI"); j) APIS Caribbean ("APIS Carib"); k) Weather Outlook ("WXO"); and l) TSA Waiver ("TSA").

Illustrated in FIG. 6b is a second portion of a trip quote summary report provided by the flight operations service provider. In particular, FIG. 6b includes an exemplary third-party fee summary 620 report including a per-leg 604 billing breakdown of third-party fees for the selected air flight services 610. As explained above, it is the PQS 106 that may be configured to access the third-party vendor database 118 (FIG. 1) and retrieve current pricing for each service requested by the user 102 in each particular location. For each leg 604, a Third Party Cost 622 may be provided, representing the approximate third-party fees incurred for the respective trip leg 604. It should be noted, however, that the third-party fee summary 620 report does not include third-party fuel charges, which will be described below.

To calculate the Third Party Cost 622 for each leg 604, the DE 120 in the PQS 106 (FIG. 1) may then be designed to add up each separate cost to obtain an approximate Third Party Cost 622 corresponding to the third-party fees for that particular trip leg 604. Furthermore, a subtotal of all third-party fees 624 may also be provided.

Also included in the third-party fee summary 620 report may be a summary of the required air navigation fees 626, or the fees charged by countries whose airspace will be crossed through during any of the air flight trip legs 604. Since these are "regional" fees that cannot be tied to any particular trip leg 604, they are calculated separately and displayed for user 102 reference.

After adding the flight operations service provider fees 628 (FIG. 6a) to the total estimated third-party fees 630 (including the air navigation fees 626), the user 102 may then be provided with an overall approximated third-party fee summary 632, representing all the third-party fees for all the trip legs 604 combined. As can be appreciated, having this approximated amount 632 may prove advantageous in that the user 102 will no longer be required to seek out various pricing and availability for the several third-party services related to an air travel trip that are required. As such, the disclosure may save the user 102 valuable time in the planning process.

Illustrated in FIGS. 6c-6d is a third portion of a trip quote summary report. In particular, FIG. 6c includes an exemplary estimated fuel charges 640 report that a user 102 may request by having previously clicked the Fuel Prices 215 button, as explained with reference to FIG. 2. The fuel charges 640 report may be configured to populate a listing of potential aircraft fuel vendors 642 for each location 644 where the aircraft will be sited. In particular, to compile the fuel charges 640 report, the PQS 106 (FIG. 1) may be configured to access the fuel table database 116 and retrieve current fuel pricing for each vendor 642 situated in each location 644.

As part of the report 640, the fuel base price 646 per gallon may be provided for each vendor 643, as well as the localized applicable fuel taxes 648 and the total fuel base price 650 per gallon (including the applicable fuel taxes 648). Thus, a user 102 may thereby be provided with a competitive listing of current fuel pricing from various vendors 642 in each city where the aircraft will be stopped.

Furthermore, as part of the third portion, the system 100 may also provide the user with a total fuel cost table 660, as shown in FIG. 6d. The total fuel cost table 660 may be configured to provide a user 102 with a current fuel cost summary for the whole air flight trip, including providing the user 102 with pricing options on where it may be more economically feasible to refuel. For example, during the first leg 604 of the trip, the selected aircraft is calculated to burn 2024 gallons of fuel 662. If the user 102 fuels the aircraft with 2024 gallons of fuel at the departure airport (KHPN) 664, fuel costs will be approximately $7,848. However, if the user 102 decides to fuel the aircraft with 2024 gallons of fuel at the arrival airport (EGGW) 666, fuel costs will be approximately $5,346, since fuel pricing at EGGW is less expensive than at KHPN. Therefore, the user 102 is provided with information allowing for strategic planning on where and when to fuel the aircraft, or if fuel tankering should be employed. As can be appreciated, a user 102 may be able to quickly and automatically retrieve fuel pricing quotes, thereby bypassing the current time-consuming process of drawing up a flight plan and figuring out where and when to refuel in light of such variables as aircraft endurance, fuel economy, safety, and the numerous options in refueling locations.

Figure 7:
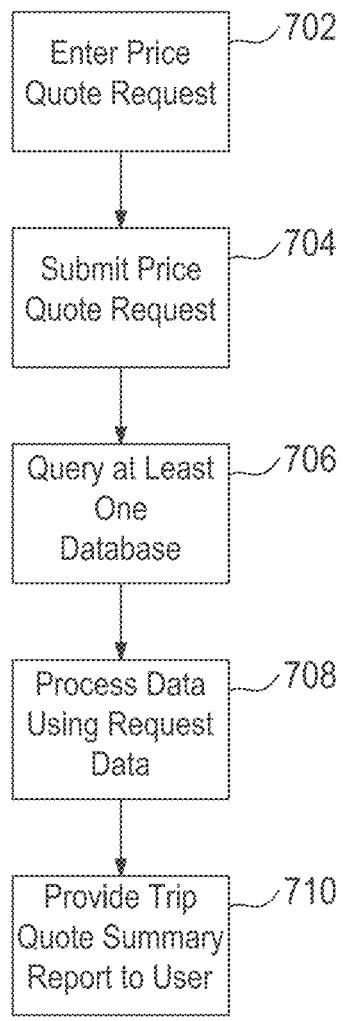
FIG. 7 illustrates a method of automatically retrieving an air flight price quote, according to one or more embodiments of the present disclosure.

Referring to FIG. 7, with continuing reference to FIG. 1, the above-described embodiments may also be disclosed and implemented in the form of a method of operating a system 100 to automatically provide air travel price quotes to a user 102 for at least one air travel trip. In one embodiment, the air travel trip may have more than one leg. After logging onto the system 100, a user may initiate communication with the OC 110 by entering a price quote request related to an air travel trip, as at step 702. The system 100 may be provided by a flight operations service provider, and logging onto the system 100 may encompass entering a username and password into a user interface 104, such as a desktop computer, so that the system 100 may recognize the particular user 102. Entering the price quote request by the user 102 may include selecting the particular aircraft to be used, choosing a departure date, determining the FAR type of the flight, and inputting the various stops to occur during the air travel trip. Furthermore, entering the price quote request may also include selecting any air flight services that may be required throughout the air travel trip.

For example, some air flight services may include: acquiring landing permits for the destination airport, acquiring overflight permits, scheduling slots, air navigation services for landing/approach, providing customs services upon reentering the U.S. including reporting Advanced Passenger Information System (APIS) required documentation in either the U.S. or the Caribbean, ground handling arrangements or flight following services, arranging for hotel reservations in foreign or domestic countries, providing ground transportation services, providing localized weather forecasts and forecasting services, catering services, flight supervision services, basic air flight crew and air flight crew transportation services, parking services, and developing and filing a flight plan with the local Civil Aviation Authority (e.g. Federal Aviation Administration in the USA).

The user 102 may then submit the price quote request to the PQS 106 through the network 108, as at step 704. The PQS 106 may be configured to process the request by first querying the various data stored in at least one database, as at step 706. In an exemplary embodiment, the PQS 106 may query data stored in a plurality of databases, such as the Airport Database 112, the Aircraft Performance Database 114, the Fuel Table Database 116, and/or the Third-Party Vendor Database. Querying the databases 112, 114, 116, 118 may generally include accessing and retrieving air travel data and air flight services information stored therein corresponding to the selections entered by the user 102 in step 702. In at least one embodiment, air travel data may include pertinent airport, aircraft, and fuel pricing data.

Once retrieved by the PQS 106, a DE 118 may then be configured to process the retrieved data using the data corresponding to the price quote request, as at step 708. In particular, the DE 118 may be configured to retrieve, process, and report pricing on all air flight services requested by the user 102 at each respective trip leg, and also provide fuel pricing for arrival and destination airports for each trip leg. The RE 120 may then be configured to provide the user 102 with a trip quote summary report indicating an estimated cost for third-party fees to be incurred during the at least one air travel trip, including the fuel pricing from various potential vendors at each arrival and destination airport for each trip leg, as at step 510. In particular, the RE 120 may be configured to process, or convert, the results of the data processing undertaken by the DE 118 into a visible graphic image for user 102 reference via the user interface 104.

The foregoing has outlined features of several embodiments so that those skilled in the art may better understand the detailed description that follows. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure.

We claim:

1. A method of automatically providing a trip quote summary report for at least one air travel trip having at least one trip leg, comprising:

entering and submitting a price quote request for air flight services provided by at least one third-party vendor to a price quoting system installed at an operational center, wherein the price quote request is entered via a user interface;

querying at least one database installed at the operational center and being recorded on a non-transitory computer-readable medium and communicably coupled to the price quoting system to retrieve air travel data and air flight service information corresponding to the price quote request;

verifying whether an aircraft selected by the user for the at least one trip leg requires refueling when flying the at least one trip leg;

processing the air travel data and air flight service information to obtain the trip quote summary report, wherein the trip quote summary report includes a summary of third-party fees for the air flight services provided by the at least one third-party vendor and an estimated aircraft fuel pricing for the at least one air travel trip;

displaying, to a user, the trip quote summary report in at least one graphic image viewable on the user interface;

processing (i) logistical information obtained from the at least one database and (ii) a result of a time and distance calculator, to display to the user, via the user interface, a geographical representation, the geographical representation including a distance and a trip time of the at least one trip leg and the logistical information for departing and arriving airports of the at least one trip leg; and processing a result of the verification to display to the user, via the user interface, a fuel stop analyzer module for the at least one trip leg when the result of the verification indicates that a refueling stop is required for the at least one trip leg, the fuel stop analyzer module configured to provide at least one fuel stop along the at least one trip leg.

2. The method of claim 1, wherein the at least one database is one of an airport database, an aircraft performance database, a fuel table database, and a third-party vendor database.

3. The method of claim 2, wherein the third-party vendor database stores current and archived pricing details for a plurality of air flight services provided by third-party vendors.

4. The method of claim 1, wherein the air travel data includes airport, aircraft, and fuel pricing data.

5. The method of claim 1, wherein processing the air travel data and air flight service information is carried out by a data engine communicably coupled to the price quoting system.

6. The method of claim 1, wherein displaying the trip quote summary report to the user and processing the logistical information and the result of the time and distance calculator are carried out by a render engine communicably coupled to the price quoting system.

7. The method of claim 1, wherein the user interface is communicably coupled to the price quoting system via a network.

8. The method of claim 7, wherein the user interface provides the user with a quote details GUI configured to allow the user to specify a departure date and an aircraft, and indicate which type of certificate the at least one air travel trip will be flying under.

9. The method of claim 7, wherein the user interface provides the user with an estimated fuel burn display module having estimated fuel burn information for the at least one trip leg.

10. The method of claim 7, wherein the user interface provides the user with a trip leg customization GUI configured to allow the user to customize the air flight services for the at least one trip leg of the at least one air travel trip.

11. The method of claim 1, wherein the summary of third-party fees of the trip quote summary report includes a per-leg billing breakdown of the air flight services provided by at the least one third-party vendor.

12. The method of claim 1, wherein the estimated aircraft fuel pricing of the trip quote summary report includes a listing of fuel pricing from aircraft fuel vendors at airports located at the at least one trip leg of the at least one air travel trip.

13. A system for automatically providing a trip quote summary report for at least one air travel trip having at least one trip leg, comprising:

a user interface configured to allow a user to input a price quote request for the at least one air travel trip including air flight services provided by at least one third-party vendor;

a price quoting system installed at an operational center and being communicably coupled to the user interface via a computer network and configured to receive and process the price quote request;

at least one database installed at the operational center and being recorded on a non-transitory computer-readable medium and communicably coupled to the price quoting system for storing and updating air travel data and air flight service information;

a data engine installed at the operational center and being communicably coupled to the price quoting system, the data engine being configured to access the air travel data and air flight service information in the at least one database, verify whether an aircraft selected by the user for the at least one trip leg requires refueling when flying the at least one trip leg, and process the price quote request into the trip quote summary report, wherein the trip quote summary report includes a summary of third-party fees for the air flight services provided by the at least one third-party vendor and an estimated aircraft fuel pricing for the at least one air travel trip; and a render engine installed at the operational center and being communicably coupled to the price quoting system, the render engine being configured to convert the trip quote summary report processed by the data engine into at least one graphic image viewable on the user interface, process a result of a time and distance calculator provided by the data engine, process logistical information obtained by the data engine from the at least one database and processed by the data engine, such that a geographical representation is displayed on the user interface, the geographical representation including a distance and a trip time of the at least one trip leg, and the logistical information for departing and arriving airports of the at least one trip leg, and process a result of the verification provided by the data engine and display a fuel stop analyzer module for the at least one trip leg on the user interface when the result of the verification indicates that a refueling stop is required for the at least one trip leg, the fuel stop analyzer module configured to provide at least one fuel stop along the at least one trip leg.

14. The system of claim 13, wherein the at least one database is one of an airport database, an aircraft performance database, a fuel table database, and a third-party vendor database.

15. The system of claim 14, wherein the third-party vendor database stores current pricing details for a plurality of air flight services provided by third-party vendors.

16. The system of claim 13, wherein the air travel data includes airport, aircraft, and fuel pricing data.

17. The system of claim 13, wherein the user interface provides the user with a quote details GUI configured to allow the user to specify a departure date and an aircraft, and to indicate which type of certificate the at least one air travel trip will be flying under.

18. The system of claim 13, wherein the user interface provides the user with an estimated fuel burn display module having estimated fuel burn information for the at least one trip leg.

19. The system of claim 13, wherein the user interface provides the user with a trip leg customization GUI configured to allow the user to customize the air flight services for the at least one trip leg of the at least one air travel trip.

20. The system of claim 13, wherein the summary of third-party fees of the trip quote summary report includes a per-leg billing breakdown of the air flight services provided by at the least one third-party vendor.

21. The system of claim 13, wherein the estimated aircraft fuel pricing of the trip quote summary report includes a listing of fuel pricing from aircraft fuel vendors at airports located at the at least one trip leg of the at least one air travel trip.

* * * * *